Feb. 25, 1941.   R. R. McATEE   2,233,024
ARTICLE RECEIVING AND DELIVERY APPARATUS
Original Filed Aug. 2, 1937   4 Sheets-Sheet 1
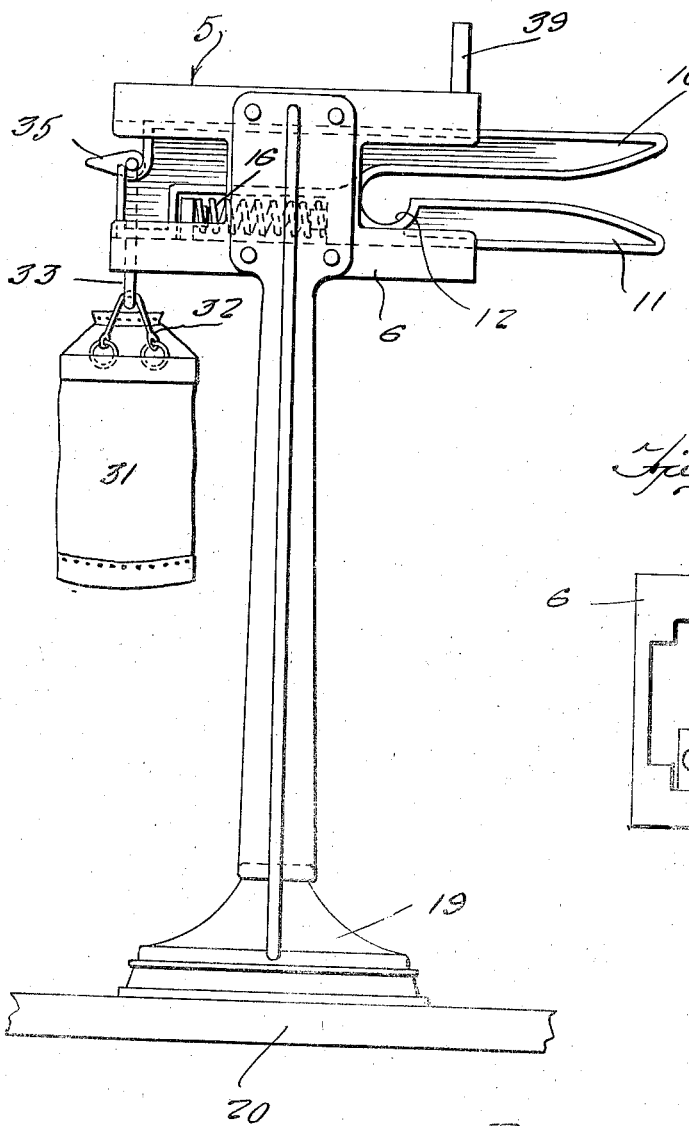
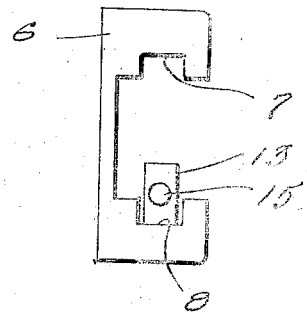
Inventor
Russell R. McAtee
By Clarence A. O'Brien
and Hyman Berman
Attorneys

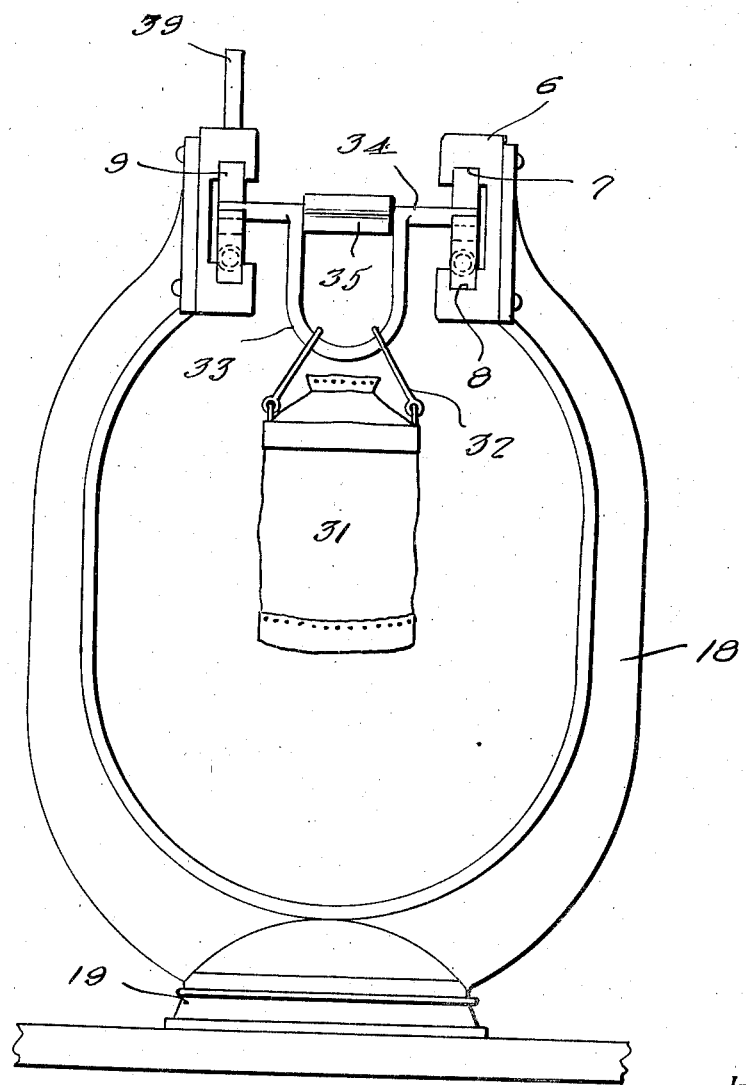

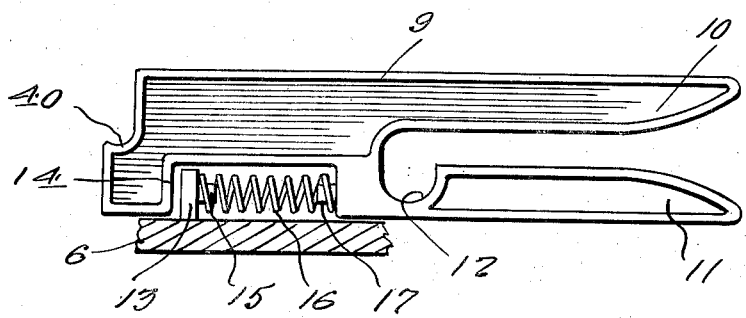
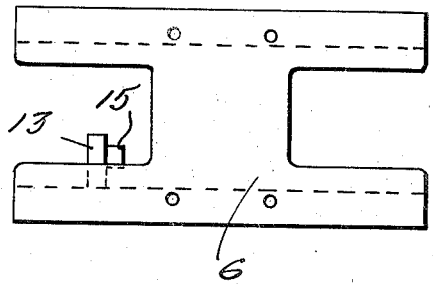
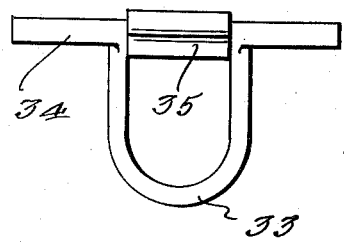
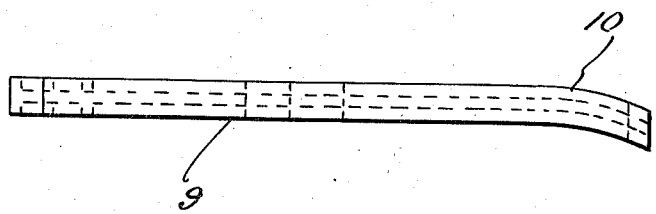

Feb. 25, 1941.   R. R. McATEE   2,233,024
ARTICLE RECEIVING AND DELIVERY APPARATUS
Original Filed Aug. 2, 1937    4 Sheets-Sheet 4
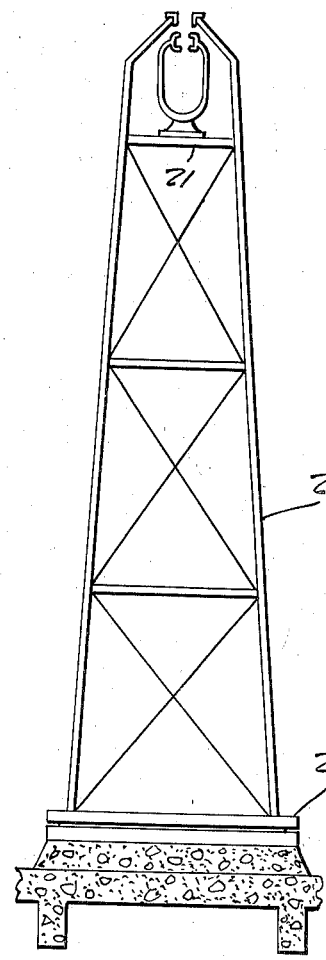
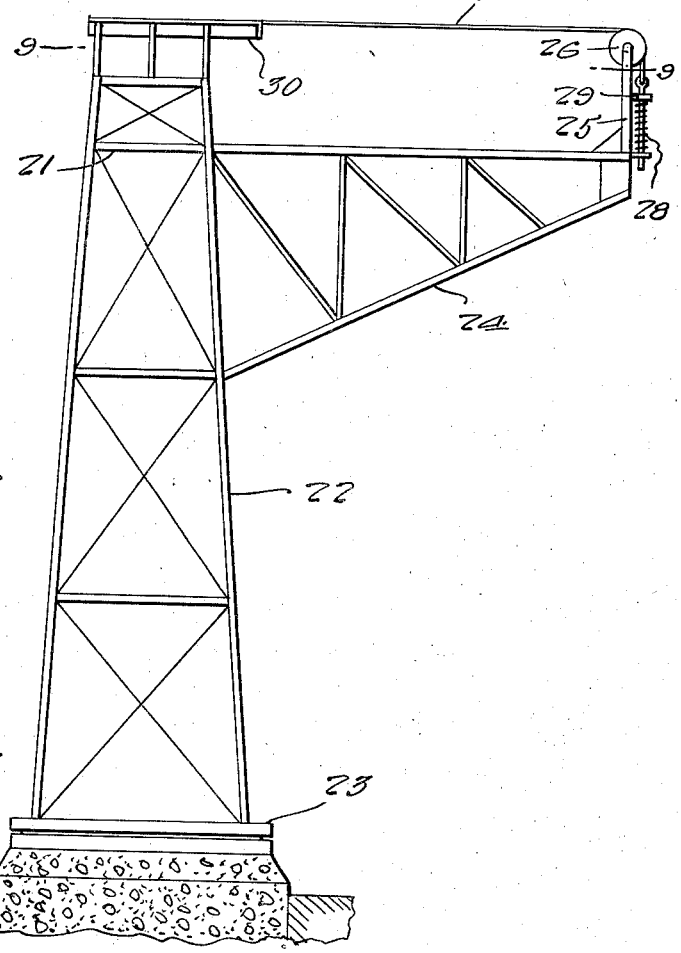
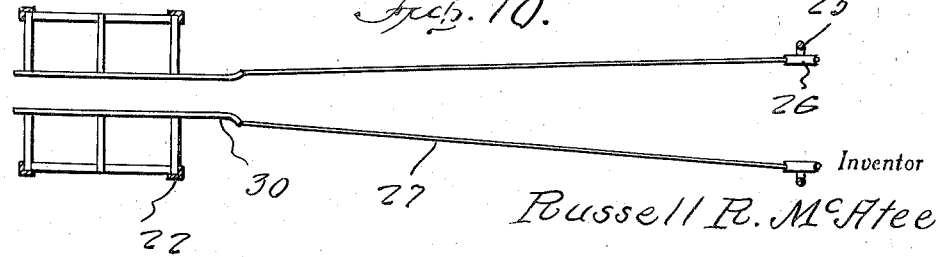
Inventor
Russell R. McAtee
By Clarence A. O'Brien
and Hyman Berman
Attorneys Patented Feb. 25, 1941

2,233,024

UNITED STATES PATENT OFFICE 2,233,024

ARTICLE RECEIVING AND DELIVERY APPARATUS

Russell R. McAtee, Joliet, Ill.

Original application August 2, 1937, Serial No. 156,908. Divided and this application March 31, 1939, Serial No. 265,293

4 Claims. (Cl. 258—11)

The present application is a division of my copending application Serial No. 156,908 filed August 2, 1937.

The present invention relates to devices for the pick-up and delivery of mail bags, parcels, packages or similar objects to and from a moving vehicle, such as road vehicles, railway trains, airplanes and the like, and has for its primary object to provide a receiving and delivery structure embodying a pair of guide arms at one end into which to deposit a ring member from which the mail bag, package or the like is suspended, said structure embodying at a relatively opposite end a delivery mechanism upon which the ring member is suspended in a convenient position for engagement by a pick-up mechanism carried by the moving vehicle.

A further object is to provide a combined delivery and receiving structure of this character adapted for mounting on a suitable standard, tower or the like, for use in receiving and delivering the package to or from road vehicles or airplanes, as the case may be.

A still further object is to provide an apparatus of this character of simple and practical construction, which is strong and durable, relatively inexpensive to manufacture and maintain in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view of the receiving and delivery apparatus.

Figure 2 is a front elevational view thereof.

Figure 3 is a side elevational view of one of the receiving forks.

Figure 4 is a top plan view thereof.

Figure 5 is a side elevational view of one of the slidable supports for the fork.

Figure 6 is an end elevational view thereof.

Figure 7 is a detail of the mail bag suspension ring.

Figure 8 is a side elevational view of the supporting tower.

Figure 9 is an end elevational view thereof, and

Figure 10 is a sectional view taken on a line 9—9 of Figure 8.

Referring now to the drawings in detail, the numeral 5 designates the receiving and delivery apparatus generally, which includes a pair of side members 6 each embodying an upper channel formation 7 and a lower channel formation 8 within which is slidably fitted the receiving fork 9 embodying an upper fork 10 and a lower fork 11 projecting from one end of said fork member, said forks 10 and 11 being arranged in vertically spaced relation and cast integrally with the body portion of the member. At the inner ends of the forks 10 and 11 is a pocket structure 12 for a purpose to be more fully hereinafter described. Each of the side members 6 is provided with an upstanding stop 13 which projects upwardly into a recess 14 formed in the body of the fork member 9 and on the stop is a horizontally extending pin 15 inserted within one end of a coiled spring 16, the other end of the spring being mounted on a pin 17 projecting rearwardly at the front end of the recess 14, the spring 16 thus serving as a resilient shock absorber for an object entering the pocket 12 between the forks 10 and 11.

The side members 6 may be secured at the upper end of a pair of oppositely curved arms 18, the arms being curved upwardly and inwardly and terminating in spaced relation from each other and preferably supported on a base 19.

The base 19 may be rotatably mounted upon a suitable foundation 20 as shown in Figure 1 of the drawings, or the base may be supported on a platform 21 of a tower 22, the tower being rotatably supported on a base 23.

The tower is employed for the pick-up and delivery of mail and other packages from airplanes and the tower includes a horizontally extending arm 24 having a pair of posts 25 rising from the outer end of the arm in spaced relation, the upper ends of the posts having pulleys 26 journalled thereon over which a cable 27 is trained. One end of the cable 27 is attached to a coiled spring 28 retained against compressing movement by a stop 29 secured to the posts 25 and the other end of the cable 27 is secured to a horizontally extending guide 30, one of the guides being positioned immediately above each side of the receiving and delivery apparatus 5 mounted on the platform 21 of the tower.

The mail bag or other parcel is designated at 31, which is provided at its top with a pair of flexible handles 32 and through which a ring 33 is inserted, the top of the ring being provided with a pin 34 which projects outwardly at each side of the ring. On the central portion of the pin 34 is pivotally mounted a lug 35, the lug being adapted for releasable engagement in a carrier (not shown) of the type covered in my co-pending application above referred to.

From the foregoing it will be apparent that the pin 34 may enter between the ends 10 and 11 of the fork and into the pocket 12 where the same will become anchored, thus serving as a receiver for the mail bag or other package.

The upstanding pin 39 on the side member 6 is provided for engaging and actuating a release mechanism (not shown) of the combined pickup and delivery carrier forming part of the subject matter of my above co-pending application.

It is believed the details of construction and manner of operation of the device will be readily understood from the foregoing without further detailed explanation.

Having thus described the invention what I claim is—

1. An article receiving and delivery apparatus comprising a support embodying a pair of upwardly and inwardly curved arms terminating in spaced relation at their upper ends, a pair of receiving forks, a guide at the upper end of each arm slidably supporting each fork thereon, shock absorbing means between each fork and its associated arm and delivery hooks formed at the rear ends of the forks.

2. An article receiving and delivery apparatus comprising a support, said support embodying a pair of upwardly and inwardly curved arms terminating in spaced relation at their upper ends, a channeled guide secured to the upper end of each of said arms, a combined receiving and delivery member slidably mounted in each of said guides, said members embodying a fork at the forward ends thereof, shock absorbing means between the member and the guide and a delivery hook formed at the rear end of each of said members.

3. In an article receiving and delivery apparatus, a supporting tower, a horizontal arm projecting from the tower adjacent its top, a pair of spaced horizontal guides mounted on the top of the tower, a combined receiving and delivery device supported on said tower beneath the guides and a pair of flexible members extending outwardly from one end of the guides as a continuation thereof and a yieldable connection at the outer ends of said flexible members for attaching the same at the outer end of said arm.

4. In an article receiving and delivery apparatus, a supporting tower, a pair of spaced horizontal guides mounted at the top thereof, flexible members forming a continuation of said guides, yieldable means connecting the flexible members to a part of the tower, and a combined receiving and delivery mechanism supported on said tower beneath said guides and adapted for engagement by an article moving along said guides.

RUSSELL R. McATEE.